US008077298B2

(12) United States Patent
Wang et al.

(10) Patent No.: US 8,077,298 B2
(45) Date of Patent: Dec. 13, 2011

(54) APPARATUS FOR MONITORING OPTICAL OBSTRUCTIONS IN AN OPTICAL SPLIT NETWORK AND METHOD THEREOF

(75) Inventors: Chih-Yih Wang, Tao Yuan (TW); Tay-Jang Liaw, Tao Yuan (TW); Sheng-Wei Wang, Tao Yuan (TW); Fwu-Yuan Tsai, Tao Yuan (TW); Chia-Hsien Wu, Tao Yuan (TW)

(73) Assignee: Chunghwa Telecom Co., Ltd., Tao Yuan (TW)

( * ) Notice: Subject to any disclaimer, the term of this patent is extended or adjusted under 35 U.S.C. 154(b) by 88 days.

(21) Appl. No.: 11/751,664

(22) Filed: May 22, 2007

(65) Prior Publication Data

US 2008/0291431 A1 Nov. 27, 2008

(51) Int. Cl.
*G01N 21/88* (2006.01)
(52) U.S. Cl. .................................................. 356/73.1
(58) Field of Classification Search ............... 356/73.1; 398/10–21
See application file for complete search history.

(56) References Cited

U.S. PATENT DOCUMENTS 7,800,744 B2 * 9/2010 Lai et al. ................ 356/73.1
2008/0062408 A1 * 3/2008 Lai et al. ................ 356/73.1

* cited by examiner

*Primary Examiner* — Gregory J Toatley
*Assistant Examiner* — Rebecca C Slomski
(74) *Attorney, Agent, or Firm* — WPAT, P.C.; Anthony King

(57) ABSTRACT

An apparatus and method for monitoring optical fiber obstructions in an optical split network is described. The monitoring apparatus comprises a broadband-monitoring light source module, an optical circulator, an optical spectral analyzer, a high-density multi-wavelength OTDR, a controlling computer, a wavelength division multiplexer, a specific wavelength optical filter, a monitoring-waveband reflector, and an optical channel selector. The monitoring apparatus utilizes the specific wavelength optical filter and the monitoring-waveband reflector to collectively construct an optical split network optical fiber obstruction monitoring apparatus for the passive optical network having multiple split routes by filtering, reflecting, and transmitting coming lights, so as to achieve the purposes of locating the obstructed split routes and obstruction locations at the same time.

11 Claims, 2 Drawing Sheets

APPARATUS FOR MONITORING OPTICAL OBSTRUCTIONS IN AN OPTICAL SPLIT NETWORK AND METHOD THEREOF

BACKGROUND OF THE INVENTION

1. Field of the Invention

The present invention relates to an apparatus and method for monitoring optical obstructions in a passive optical network; and, particularly, relates to an apparatus and method for monitoring optical fibers and measuring obstruction locations in a passive optical network by integrating optical filters having specific wavelength and monitoring a monitoring-waveband reflector to filter and reflect inputting lights, achieving the simplicity and high efficiency.

2. Description of the Prior Art

As a result of the rapid growth of the global Internet, conventional networks cannot handle demands from high-speed data transformation applications due to the revolution in communication industry. Technologies in the developed optoelectronics industry and various applications for different products have timely provided a best solution in response to a demand for large bandwidth in the rapid growth of the global Internet, high-quality media network, and variety of data communications. Various architectures for optical communication network are successively developed and the passive optical network service system is most attended. Therefore, it is necessary to develop an apparatus and method for monitoring respective branches line in a passive optical network to cope with the demands of monitoring in particular network architectures in the future.

It is not easy to monitor optical fibers in a passive optical network according to an original design of branch line. In the past, the manner of monitoring that uses the Optical Time Domain Reflectometer (OTDR) was commonly adopted. However, all divergent signals in a locus chart of the OTDR are overlapped and any one of the signals cannot thus be identified alone. To solve such an identification problem, adding an additional active-identifying component is employed but the interaction between a communication network and a host computer in the central office is required, normally augmenting the complexity of the monitoring system; additionally, using excess length shifted fiber with a reflecting element as an identifying component is also employed, but it is difficult in design and installation since the branches line are different in length. Such the monitoring manner by using the OTDR is hardly to be accomplished because of the limitation of the Dynamic Range and the Event Dead Zone of the OTDR when the number of the branches line increases.

Additionally, a tunable laser light source, circulator device, and light power meter are also employed in a terminal side with the fiber bragg grating (FBG) fiber which may reach the goal of detecting obstructions though but cannot simultaneously display a real time status of all routes as measuring each branch line. Instead, the tunable laser light source has to cyclically switch to different wavelength monitored, consuming a lot of time when a great number of branch line. Taking this approach may be aware of the split route being obstructed but may not identify a location of the obstruction, remaining a restriction in maintenance.

In view of the above, the conventional stuff still has a lot of drawbacks to be fine-designed goods and should be improved.

Upon the drawbacks incurred by the above conventional goods, the inventor of the present invention has given every effort in reformation and innovation. After years of painstaking efforts, finally, an apparatus and method of monitoring optical obstructions in an passive optical network has been successfully developed.

SUMMARY OF THE INVENTION

The objective of the present invention is to provide an apparatus and method of monitoring optical obstructions in an passive optical fiber network, cooperating to the deposition of the passive optical-fiber network service system in home. When the service system got a problem, the branch line may be monitored in a central office whether is off-line or involved with high value of light loss to clearly identify it is an issue of the service system or the optical fiber route and correctly show the route and its location of the obstruction, so as to reduce the business cost and improve the efficiency of maintenance.

The apparatus and method of monitoring optical obstructions in an passive optical network of the present invention achieving the above mentioned objectives is to use a set of optical-fiber monitoring and measuring apparatus to real time monitor different monitored wavelength and power of light reflected back from the passive optical network, reaching the both purposes of identifying obstructed branch line and obstruction location. The method is to utilize a optical spectrum analyzer for real time monitoring different monitored wavelength and its power of light reflected back from the passive optical network. A control computer analyzes the measurement and then determines a newest status of any one of the branches line. If an optical fiber is damaged or faulted, a high density and multi-wavelength OTDR is activated, measuring the obstruction location of corresponding wavelength to warn and as a basis for a subsequent process.

These features and advantages of the present invention will be fully understood and appreciated from the following detailed description of the accompanying drawings.

These features and advantages of the present invention will be fully understood and appreciated from the following detailed description of the accompanying Drawings.

DETAILED DESCRIPTION OF THE PREFERRED EMBODIMENT

Figure 1:
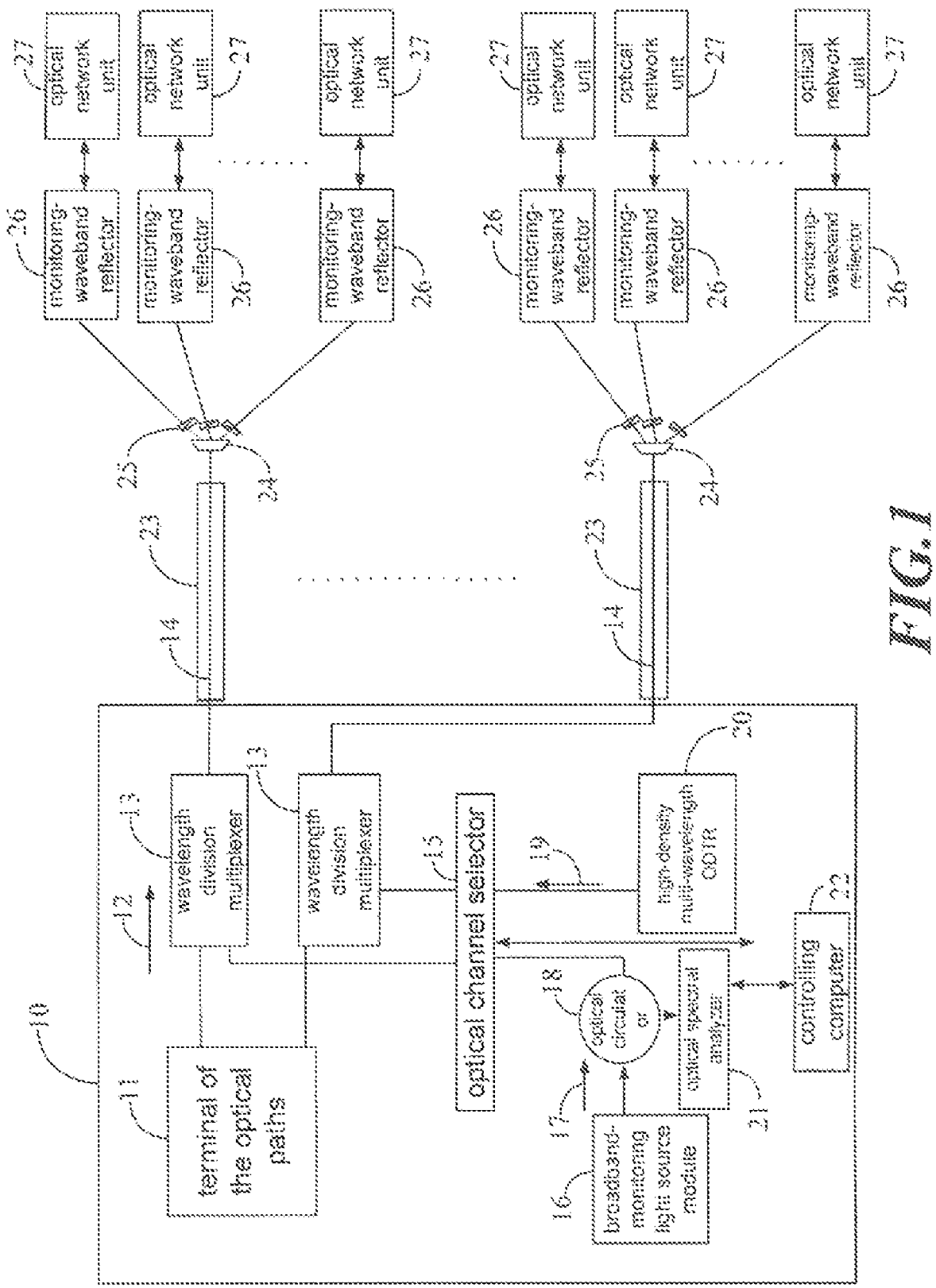
FIG. 1 is a schematic diagram of the architecture of an apparatus and method of monitoring optical obstructions in an passive optical network of the present invention.

FIG. 1 shows a schematic diagram of the architecture of an apparatus and method of monitoring optical obstructions in an passive optical network of the present invention that comprises:

A broadband-monitoring light source module 16 for continuously transmitting a light source of the monitored waveband 17;

An optical circulator 18 for coupling with the light sent by the broadband-monitoring light source module 16, delivering the light into an optical network, and then receiving a monitoring light reflected back from the optical network and subsequently sending it into the optical spectrum analyzer 21;

An optical channel selector 15 for connecting to monitoring apparatuses and each optical fiber route;

A wavelength division multiplexer 24 for integrating the optical signals of the service waveband 12 and the monitored waveband 17 and delivering it into the optical fiber 14;

A specific wavelength optical filter 25 for filtering a specified monitored wavelength optical signal of the waveband 12 and the monitored waveband 17 in the input light;

A monitoring waveband reflector 26 for reflecting a specified monitored waveband within the coming light and allowing the optical signals of the service waveband 12 passing through;

An optical spectrum analyzer 21 for measuring respective monitored waveband and light power reflected back from the optical circulator 18 and passive optical network;

A controlling computer 22 for monitoring the entire process, and for retrieving, analyzing, and comparing wave diagrams and locus charts measured by the optical spectrum analyzer 21 and the high density multi-wavelength OTDR 20 so as to acquire a latest status of whole optical fiber branches line and perform each controlling command; and A high density multi-wavelength OTDR 20 for measuring an optical power of any distance in different branch line of the optical network based on different wavelengths.

Figure 2:
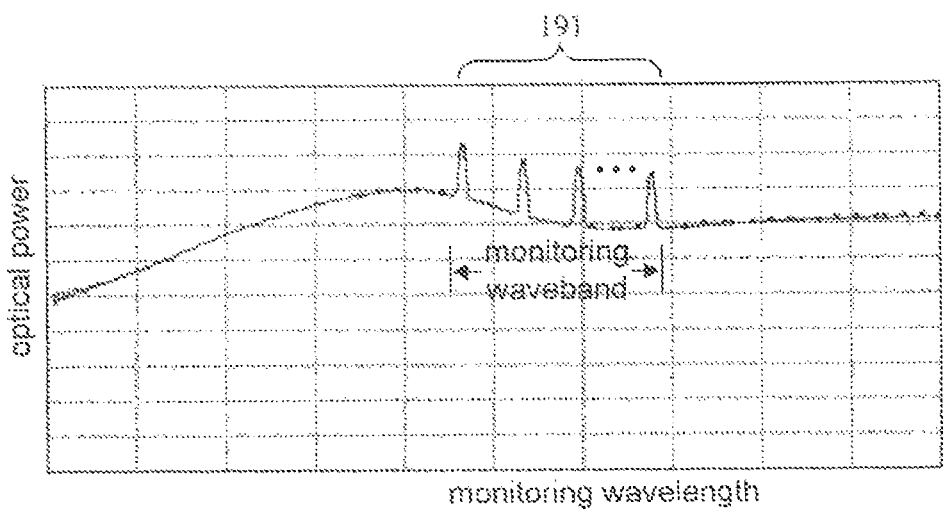
FIG. 2 is a schematic diagram of reflecting wave, shown by a optical spectrum analyzer, of the apparatus and method of monitoring optical obstructions in an passive optical network of the present invention.
Figure 3:
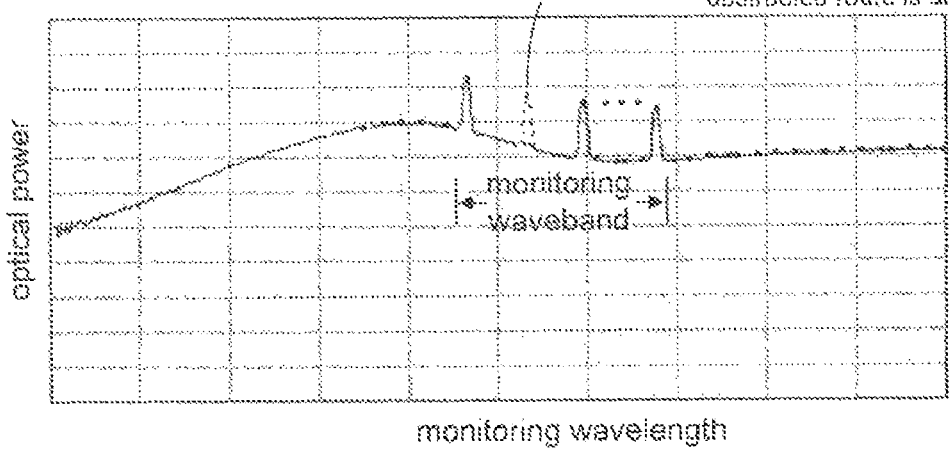
FIG. 3 is a schematic diagram of disappearing reflecting wave of an obstructed branch line, shown by a optical spectrum analyzer, of the apparatus and method of monitoring optical obstructions in an passive optical network of the present invention.

The monitoring apparatus is primarily placed in the central office 10. The optical line terminal (OLT) 11 transmits optical signals of the service waveband 12 to the division multiplexer 13. The monitoring apparatus transmits optical signals of the monitoring waveband 17 via the optical circulator 18 by the broadband-monitoring light source module 16, and the optical signals are subsequently transmitted to the division multiplexer 13 via the optical channel selector 15. The division multiplexer 13 integrates the optical signals from the service waveband 12 and the monitoring waveband 17, and then transmits the signals through the optical fiber 14, optical cable 23 outside the central office, and the optical splitter 24 for dividing the light to optical branches line. A great portion of the wavelength of the monitored waveband of each optical branch signal will be filtered out when passing through the specific wavelength optical filter 25. Only optical signal matching a specified monitored wavelength that corresponds to one particular branch line and the optical signals of the service waveband will be allowed to enter the end of each route. The optical signal to the end will firstly pass through the monitoring-waveband reflector 26 where the optical signal of the service waveband 12 may pass through the monitoring-waveband reflector 26 then enter into the optical network unit (ONU) 27 to provide service for subscribers. When the optical signal of the specific monitoring wavelength in the monitoring waveband 17 enters into the monitoring-waveband reflector 26, a particular monitored wavelength will be reflected. The monitoring-waveband reflector 26 of each branch line is identical and is able to reflect a unique and different specified monitored wavelength. The reflected monitored wavelength returns, along an original route, to the division multiplexer 13 via the specific wavelength optical filter 25, splitter 24, optical cable 23, and optical fiber 14, and then is received and measured by the optical spectrum analyzer 21 through the optical channel selector 15 and the optical circulator 18 for acquiring a reflective wave diagram of the entire optical branch line. As shown in FIG. 2, the controlling computer 22 retrieves the wave diagram for comparing and analyzing the reflective waveforms 191 of different routes to acquire a latest status of the entire optical branch line. When any one of the branch lines has occurred an obstruction, the reflective waveform of the entire branch lines will be like as shown in FIG. 3 that the reflective waveform 192 of the obstructed route is disappeared. The controlling computer 22, by comparing and analyzing, may determine which branch line has been obstructed and immediately shifts to a process of measuring obstruction location.

Figure 4:
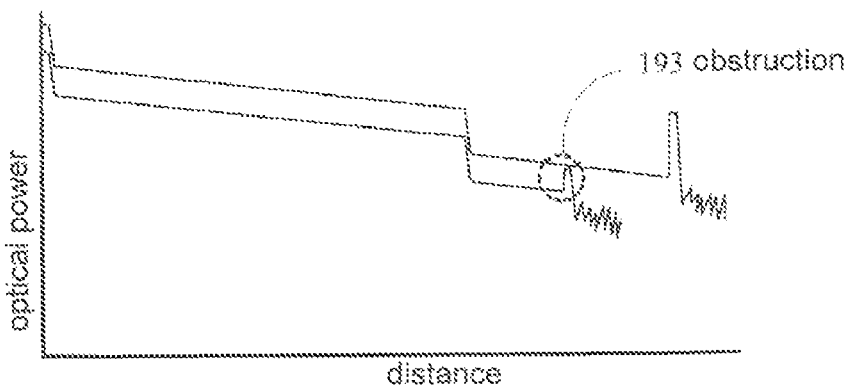
FIG. 4 is a comparison diagram illustrating the original and the obstruction locus of an obstructed branch line of a high density and multi-wavelength OTDR of the apparatus and method of monitoring optical obstructions in an passive optical network of the present invention.

The process of measuring obstruction location is that the high density multi-wavelength OTDR 20 sends out a specified measuring wavelength 19 corresponding to the obstructed branch line through the optical channel selector 15, division multiplexer 13, optical fiber 14, optical cable 23, optical splitter 24, specific wavelength optical filter 25, and finally the monitoring-waveband reflector 26. The high density multi-wavelength OTDR 20 may thus measure a latest locus chart of the branch line analyzed by the controlling computer 22. As shown in FIG. 4, the location of the obstruction 193 on the obstructed branch line can thus be identified and took as a basis for following processes.

The application of the present invention can also be extended. As shown in FIG. 1, in addition to inputting the monitoring waveband and the specified optical signals for measuring wavelength according to different processes, the optical channel selector (OCS) 15 is capable of connecting to a plurality of division multiplexers 13 and optical networks and apparatuses behind and switching to different optical paths based on the monitoring process by the controlling computer so as to expand a passive optical network and area to be monitored, increasing the beneficial result of usage of the monitoring apparatus and diminishing the cost in monitoring.

The present invention is an apparatus and method for monitoring whether the status of an optical fiber at any locations of any optical fiber branches line in a passive optical network is normal or not. Comparing to the monitoring manner utilizing the conventional optical power or the optical time domain reflectometer, the present invention provides a more comprehensive and more efficient manner of monitoring.

The apparatus and method for monitoring optical obstructions in an passive optical network of the present invention has the following advantages when is compared to the preceding citations and other conventional techniques:

1. The present invention may employ the monitoring apparatus with a specific wavelength optical filter and monitoring waveband reflector at the end of routes to avoid a mutual interference caused by branches line monitoring signals and to increase the identification ability, providing a feasible, reliable, and high efficient method for monitoring multi-branches line in a passive optical network.

2. The present invention is easy to establish that the standard monitoring-waveband reflector has to be set up only one time for various optical fiber split routes.

3. The present invention may simultaneously monitor and show a latest status of the optical fibers of several branches line, achieving the purpose of fast monitoring and solving the problem that the location of the obstruction in a branch line is hard to be located.

4. The present invention may perform a one-sided and long-term automatic monitor, rapidly and clearly identifying an obstruction in the service system or optical fiber routes. The latest status of each branch line may further perform a precautious maintenance to provide a better service quality.

5. The present invention may reduce the personnel expense in maintaining network and further ensure the reliability and stability of a passive optical network to raise the efficiency of maintenance whose economic effect is apparent.

The above detailed description is a concrete explanation for a practicable embodiment of the present invention rather than a limitation to the claim scope of the application. Any equivalent practice or modification contained in the concept of the present invention should be included in the claim scope of the application.

To sum up, the present invention is not only novel in a type of space but also makes several above-mentioned improvements in view of conventional articles that should fully comply with the statutory requirements for a new invention patent regarding novelty and non-obviousness, and thus apply for a patent according to the related laws. The applicant respectfully hopes granting the subject application a patent as well.

Many changes and modification in the above-described embodiment of the invention can, of course, be carried out without departing from the scope thereof. Accordingly, to promote the progress in science and the useful arts, the invention is disclosed and is intended to be limited only by the scope of the appended claims.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An apparatus of monitoring optical fiber obstructions in a passive optical network, comprising:
    a broadband-monitoring light source module transmitting optical signals of a monitoring waveband to an optical circulator;
    the optical circulator receiving the optical signals of the monitoring waveband sent by the broadband-monitoring light source module;
    an optical channel selector receiving the optical signals of the monitoring waveband from the optical circulator and sending to a wavelength division multiplexer, and switching to a different-passive optical network according to a monitoring procedure;
    wherein the wavelength division multiplexer integrating a service waveband and the monitoring waveband and transmitting to an optical fiber of the passive optical network;
    a specific wavelength optical filter receiving the monitoring waveband in the optical fiber and filtering most of the wavelength in the monitoring waveband except for a specified monitoring wavelength corresponding to a branch of the optical fiber, and a monitoring-waveband reflector along with the optical signals of the service waveband is connected to the end of the branch;
    wherein the monitoring-waveband reflector receiving the specified monitoring wavelength sent from the specific wavelength optical filter and reflecting a specified monitoring wavelength of the branch;
    wherein the optical circulator receiving the optical signals of the monitoring waveband reflected back from the optical network unit and sending the reflected optical signals to an optical spectrum analyzer;
    the optical spectrum analyzer receiving and measuring the wavelength and optical power of each of the monitoring waveband sent by the optical circulator and reflected back from the optical network unit to acquire a reflective waveform diagram;
    a controlling computer retrieving and analyzing the reflective waveform diagram to locate obstructed routes and to execute a procedure of measuring an obstruction location; and
    a high density multi-wavelength OTDR sending a specified measuring wavelength that corresponds to an obstructed branch to the optical channel selector for a comparison and analysis of the controlling computer to acquire the obstruction location of the obstructed branch.

2. The apparatus of monitoring optical fiber obstructions in a passive optical network of claim 1, wherein when the branch is identified as obstructed, the high-density multi-wavelength OTDR, controlled by the controlling computer, sends the specified measuring wavelength corresponding to the obstructed branch and measures a latest locus chart of the branch for determining the obstruction location of the obstructed branch.

3. The apparatus of monitoring optical fiber obstructions in a passive optical network of claim 1, wherein the controlling computer connects to the broadband-monitoring light source module, the optical spectrum analyzer, the optical channel selector, and the high-density multi-wavelength OTDR, monitoring an entire process and retrieving, computing, comparing, and analyzing the reflective waveform diagram of the optical spectrum analyzer and the locus chart of the high density multi-wavelength OTDR to acquire a latest status of entire optical fiber branches.

4. The apparatus of monitoring optical fiber obstructions in a passive optical network of claim 1, wherein the specific wavelength optical filter is disposed at the front end of the branch for passing optical signals of the service waveband and the specified monitoring wavelength of the monitored waveband.

5. The apparatus of monitoring optical fiber obstructions in a passive optical network of claim 1, wherein the monitoring-waveband reflector is disposed at the rear end of the branch for passing optical signals of the service waveband to reflect the specified monitoring wavelength.

6. The apparatus of monitoring optical fiber obstructions in a passive optical network of claim 1, wherein features of the optical channel selector includes:
    (a) switching to a different passive optical network according to the monitoring procedure, serially connecting the optical circulator to the broadband-monitoring light source module under a normal state, continuously monitoring the optical power of the branch, and then switching to the high-density multi-wavelength OTDR to measure the obstruction location;
    (b) when applying the passive optical network, an optical path is linked to the wavelength division multiplexer and a monitoring apparatus is used to monitor the passive optical network.

7. A method of monitoring optical fiber obstructions in a passive optical network, comprising steps of:
    (a) sending optical signals of a service waveband from a central office of an optical line terminal to a wavelength division multiplexer in which a monitoring apparatus sends the optical signals of a monitoring waveband by a broadband-monitoring light source module via an optical circulator and the optical signals of the monitoring waveband is transmitted to the wavelength division multiplexer via an optical channel selector, and the wavelength division multiplexer integrates the optical signals of both the service waveband and the monitoring waveband such that integrated optical signals are delivered within an optical fiber to be measured to an end of a branch through optical cables, a splitter, and a specific wavelength optical filter and finally enters into a monitoring-waveband reflector where only the optical signals with a specified monitoring wavelength will be reflected back to the central office;

(b) an optical spectrum analyzer placed in the central office concurrently receiving and measuring the optical signals of a different monitoring wavelength reflected back from the branch to acquire a latest status of waveforms of the branch;

(c) analyzing the waveforms by comparing the waveforms of a reflected measuring wavelength and the magnitude of an original optical power of the monitoring waveband;

(d) determining the latest status of the branch by analyzing the waveforms of the reflected measuring wavelength and the magnitude of the original optical power in which a disappeared waveform of the specified monitoring wavelength that corresponds to the branch represents that the branch is obstructed, an optical power less than a predetermined threshold represents that the branch is abnormal, and an optical power near an original value represents that the branch is normal;

(e) activating a high density multi-wavelength OTDR if one of the waveforms of the branch is abnormal, for measuring an obstruction so as to locate the branch and a location of the obstruction.

8. The method of monitoring optical fiber obstructions in a passive optical network of claim 7, wherein determining the location of the obstruction of the branch is by comparing a primitive locus chart with a latest locus chart of the high-density multi-wavelength OTDR.

9. The method of monitoring optical fiber obstructions in a passive optical network of claim 7, characterized in that a front end of the branch of the splitter is equipped with the specific wavelength optical filter and each rear end is equipped with the monitoring-waveband reflector for filtering, reflecting, and transmitting inputting lights so as to avoid a mutual interference of branch monitoring signals and to increase an identification ability.

10. The method of monitoring optical fiber obstructions in a passive optical network of claim 7, wherein the optical channel selector connects with the wavelength division multiplexer and the passive optical network and the monitoring apparatus behind, and the passive optical network and areas to be monitored being expanded by switching to a different passive optical network according to a monitoring procedure through the controlling computer, increasing beneficial results of usage of the monitoring apparatus and diminishing cost in monitoring.

11. The method of monitoring optical fiber obstructions in a passive optical network of claim 7, wherein the steps of measuring the obstruction location are as followings:

(a) sending the specified monitoring wavelength by the high density multi-wavelength OTDR corresponding to an obstructed branch to the monitoring-waveband reflector via the optical channel selector, the wavelength division multiplexer, the optical fibers, the optical cables, the splitter, and the specific wavelength optical filter;

(b) measuring the latest locus chart of the branch by the high density multi-wavelength OTDR;

(c) comparing and analyzing an original waveform diagram, which is a locus chart of a original optical route measured while setting the passive optical network, and a reflective waveform diagram, which is the latest locus chart of split route by the high-density multi-wavelength OTDR, by the controlling computer to locate the location of the obstruction of the obstructed branch and taking it as a basis of warning in following procedures.

* * * * *